(12) United States Patent
Takachi

(10) Patent No.: US 7,032,719 B2
(45) Date of Patent: Apr. 25, 2006

(54) BICYCLE HUB WITH AN OUTSIDE-ACCESSIBLE BRAKE FORCE ADJUSTING MECHANISM

(75) Inventor: Takeshi Takachi, Kawachinagano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/604,814

(22) Filed: Aug. 19, 2003

(65) Prior Publication Data
US 2004/0104082 A1   Jun. 3, 2004

(30) Foreign Application Priority Data
Aug. 22, 2002   (JP)   .............................. 2002-241795

(51) Int. Cl.
*B62L 5/00*   (2006.01)
*B60T 1/06*   (2006.01)
(52) U.S. Cl. .......................................... 188/26; 188/17
(58) Field of Classification Search ................. 188/17, 188/24.11, 26; 301/110.5, 105.1
See application file for complete search history.

(56) References Cited

U.S. PATENT DOCUMENTS

| 3,799,472 A | * | 3/1974 | Svensson ..................... 242/270 |
| 4,109,762 A | * | 8/1978 | Wood ........................... 188/26 |
| 5,456,336 A | * | 10/1995 | Bopp ........................... 188/17 |
| 5,570,760 A | * | 11/1996 | Lai .............................. 188/26 |
| 6,559,564 B1 | * | 5/2003 | Itou ........................... 310/67 A |
| 2003/0057032 A1 | * | 3/2003 | Liu .......................... 188/24.11 |

FOREIGN PATENT DOCUMENTS

| EP | 688 713 A2 | 12/1995 |
| EP | 1122094 A2 | * 8/2001 |

OTHER PUBLICATIONS

Patent Abstracts of Japan, vol. 018, No. 605 (M-1706), published Nov. 17, 1994; for JP 06-227472 A (Nakano), published Aug. 16, 1994.

* cited by examiner

*Primary Examiner*—Thomas Williams
(74) *Attorney, Agent, or Firm*—James A. Deland (57) ABSTRACT

A bicycle hub comprises a hub shaft structured to be rotatably mounted to a bicycle frame, a hub shell rotatably supported relative to the hub shaft, and a brake force control mechanism housed by the hub shell. The brake force control mechanism includes a brake force adjusting mechanism that can be accessed for adjustment while the brake force control mechanism is housed within the hub shell.

26 Claims, 5 Drawing Sheets

BICYCLE HUB WITH AN OUTSIDE-ACCESSIBLE BRAKE FORCE ADJUSTING MECHANISM

BACKGROUND OF INVENTION

The present invention is directed to bicycles and, more particularly, to a bicycle hub that uses a braking mechanism.

A typical bicycle hub generally includes a hub shaft that is detachably and non-rotatably mounted to the fork (frame) of the bicycle, a cylindrical hub shell (outer shell) that is mounted around the hub shaft, and bearings that rotatably support the hub shell to the hub shaft. Hub flanges are formed at opposite ends of the hub shell for mounting the hub shell to the spokes of the wheel. A brake apparatus that controls the rotation of the hub shell relative to the hub shaft may be mounted between the bicycle frame and the hub shell. In some bicycles, a braking force control mechanism that includes a friction clutch may be mounted inside the hub. The braking force control mechanism provides an antilock function for the hub by causing the friction clutch to slip when the brake apparatus applies a potentially excessive braking force.

A conventional braking force control mechanism has a brake-side member that engages a portion of the brake apparatus (e.g., a brake drum), a friction engagement unit that creates a friction force in a brake force path between the hub shell with the brake-side member, and a friction force adjustment unit that adjusts the friction force of the friction engagement unit. The friction engagement unit comprises a plurality of first friction members and a plurality of second friction members, wherein the plurality of first friction members nonrotatably engage the brake-side member, the plurality of second friction members nonrotatably engage the hub shell, and the plurality of first friction member are interleaved with the plurality of second friction members. The plurality of first friction members and the plurality of second friction members are sandwiched between the brake side member and the friction force adjustment unit. More specifically, the friction force adjustment unit includes a nut member and a spring washer, wherein the nut member screws to the brake side member and the spring washer is disposed between the nut member and the plurality of first and second friction members. Screwing the nut member toward the brake side member causes the spring washer to press against the plurality of first and second friction members, thus increasing the friction force between the first and second friction members. Conversely, screwing the nut member away from the brake side member causes the spring washer to move away from the plurality of first and second friction members, thus decreasing the friction force between the first and second friction members.

The braking force control mechanism usually is housed inside the hub shell. Accordingly, such braking force control mechanisms usually are adjusted prior to assembly within the hub shell. When adjustment of the braking force control mechanism is completed, the hub shell, bearings and hub shaft are assembled, thereby completing assembly of the hub. However, during assembly of the hub there is a possibility that the plurality of first or second friction members may be slightly deformed or otherwise altered in position such that the set friction force changes. If that happens, the hub must be disassembled so that the braking force control mechanism may be readjusted, and then the hub must be reassembled. Therefore, if the friction force changes, time-consuming and labor-intensive work must be carried out in order to readjust the braking force.

SUMMARY OF INVENTION

The present invention is directed to various features of a braking apparatus for a bicycle. In one embodiment, a bicycle hub comprises a hub shaft structured to be rotatably mounted to a bicycle frame, a hub shell rotatably supported relative to the hub shaft, and a brake force control mechanism housed by the hub shell. The brake force control mechanism includes a brake force adjusting mechanism that can be accessed for adjustment while the brake force control mechanism is housed within the hub shell. Additional inventive features will become apparent from the description below, and such features alone or in combination with the above features may form the basis of further inventions as recited in the claims and their equivalents.

DETAILED DESCRIPTION

Figure 1:
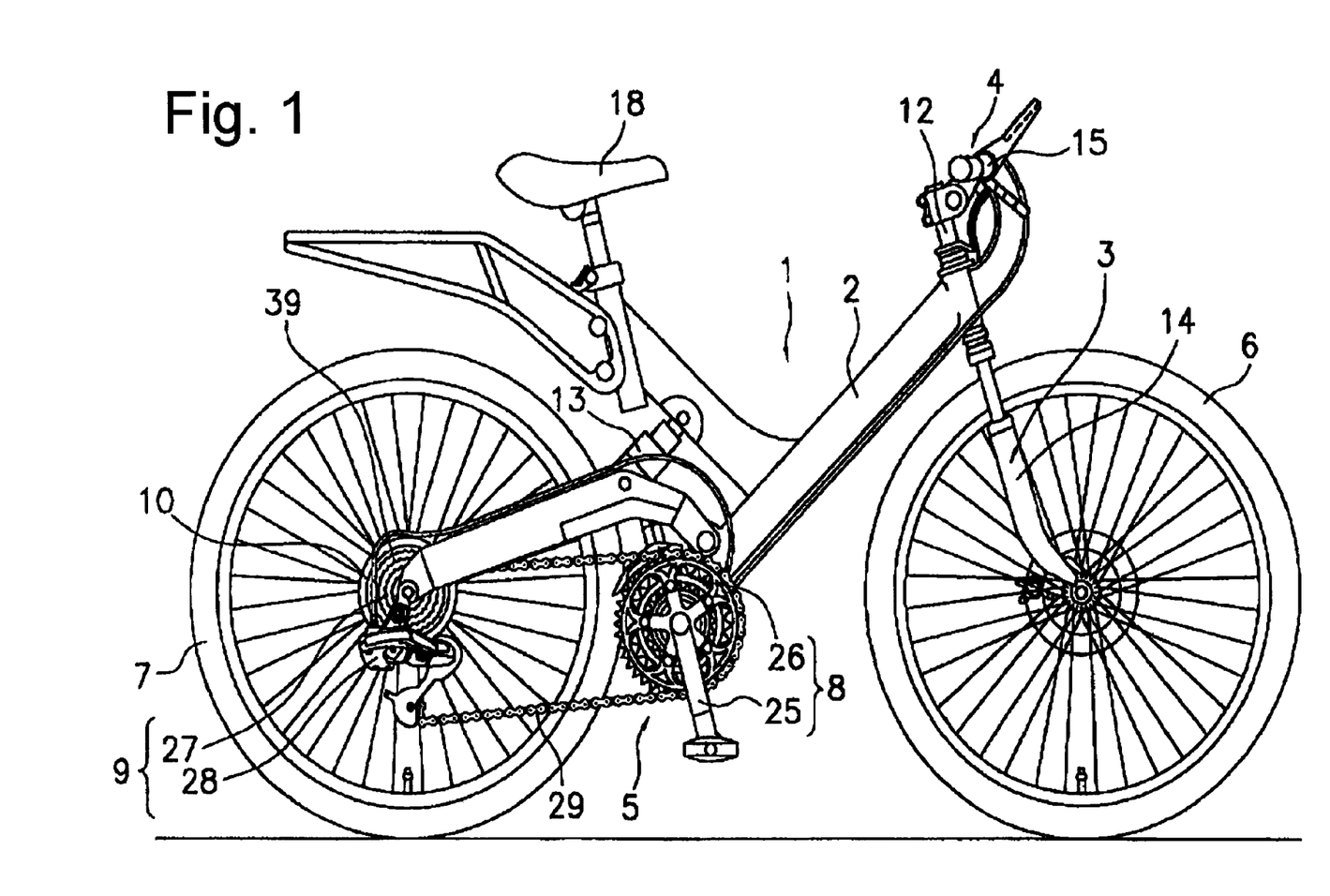
FIG. 1 is a side view of a bicycle that includes a brake force control mechanism.
Figure 2:
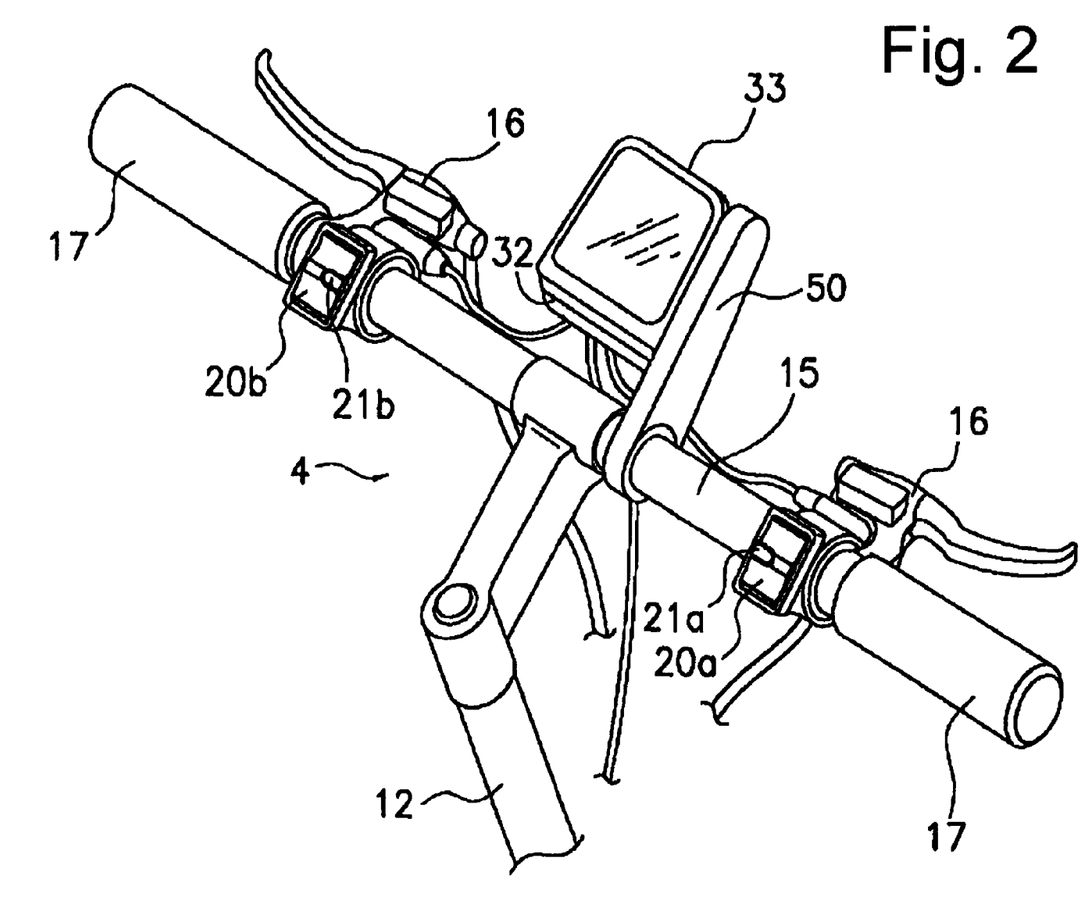
FIG. 2 is a partial cross-sectional view of a wheel hub that includes a brake force control mechanism.

FIG. 1 is a side view of a bicycle 101 that includes a brake force control mechanism. Bicycle 101 comprises a frame 102 that includes a front fork 98, a handlebar 104 fixed to the front fork 98, a drive unit 105 comprising a chain and pedals, and front and rear wheels 106 and 107 with spokes 99. As shown in FIG. 2, a front hub 1 includes a hub shaft 10, a hub shell 11 that is placed around the hub shaft 10, and first and second bearings 13 and 14 that are disposed between the hub shaft 10 and the hub shell 11 at opposite ends of the hub shell 11. A male threaded portion 10a is formed on the outer surface of the hub shaft 10, and the hub shaft 10 is secured to the ends of the front fork 98 using nuts 52. A brake force control mechanism 15 is disposed on one side of the hub shell 11 (the left side in FIG. 2). When a roller brake 80 is mounted to the front hub 1, part of an excessive braking force input from the roller brake 80 can be eliminated by the brake force control mechanism 15.

The hub shell 11 has a left hub shell 16 on which a first hub flange 11a is formed, a right hub shell 17 on which a second hub flange 11b is formed, and a cylindrical connecting member 18 that connects the two hub shells 16 and 17. The left hub shell 16 may be formed from forged aluminum alloy, for example, and it curves inward significantly relative to the end on which the first hub flange 11a is formed so that it has a smaller diameter at the other end. A plurality of splines 16a (FIG. 4) are circumferentially disposed around the inner peripheral surface of left hub shell 16. The right hub shell 17 may be formed by press-molding an aluminum alloy plate, for example. The connecting member 18 has steps 18a and 18b to which the hub shells 16 and 17 are press-fit.

The first bearing 13 comprises a first cone 20 that screws onto the hub shaft 10, a first cup 21 formed in the brake force control mechanism 15, and a plurality of balls 22 disposed between the first cone 20 and the first cup 21. The second bearing 14 has a second cone 23 that screws onto the hub shaft 10, a second cup 24 that is press-fit into the curved portion of the right hub shell 17, and a plurality of balls 25 that are disposed between the second cone 23 and the second cup 24. The cones 20 and 23 are rotationally and axially locked in place by lock nuts 26 and 27, respectively.

Figure 3:
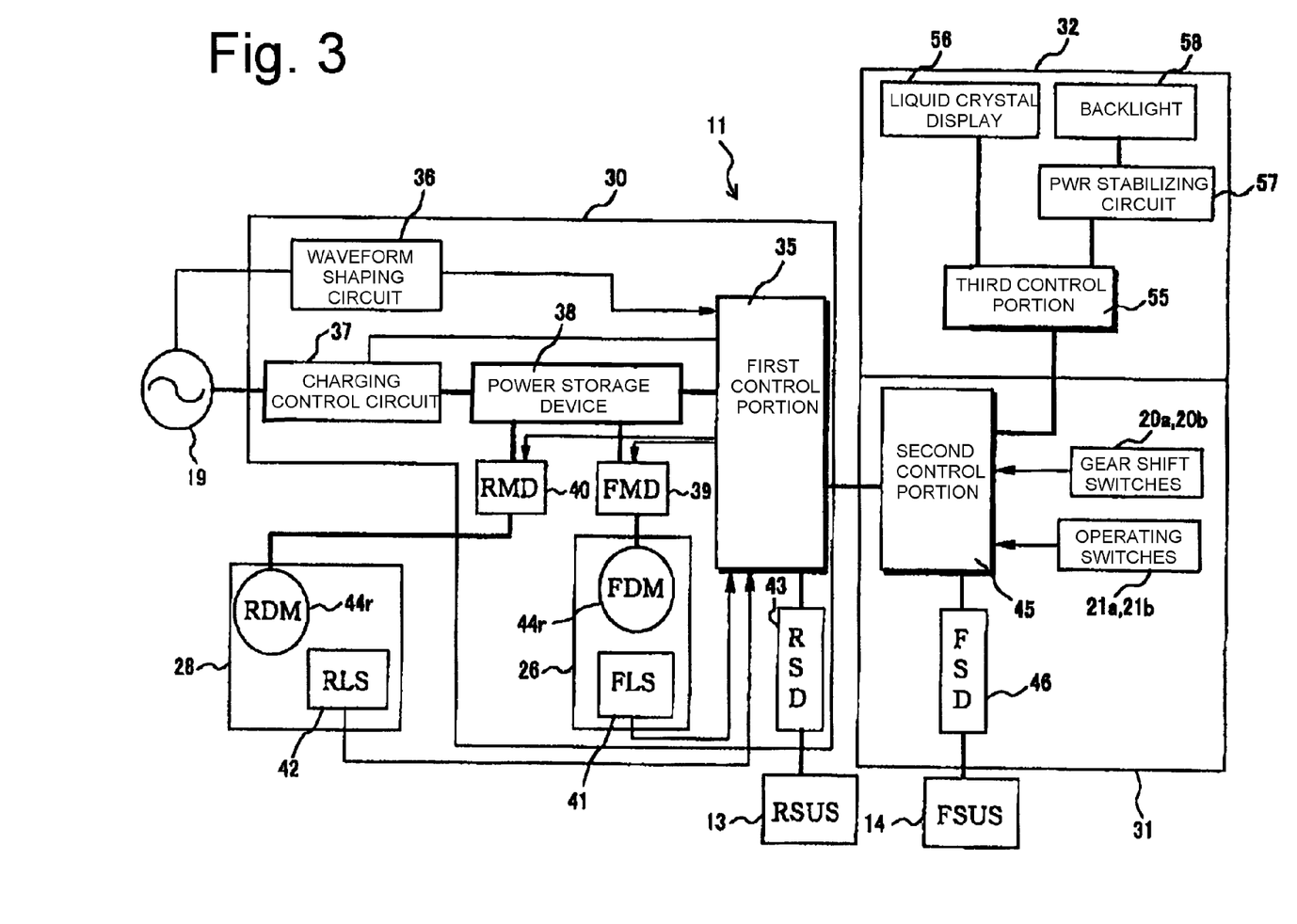
FIG. 3 is a more detailed cross-sectional view of a brake force control mechanism.
Figure 4:
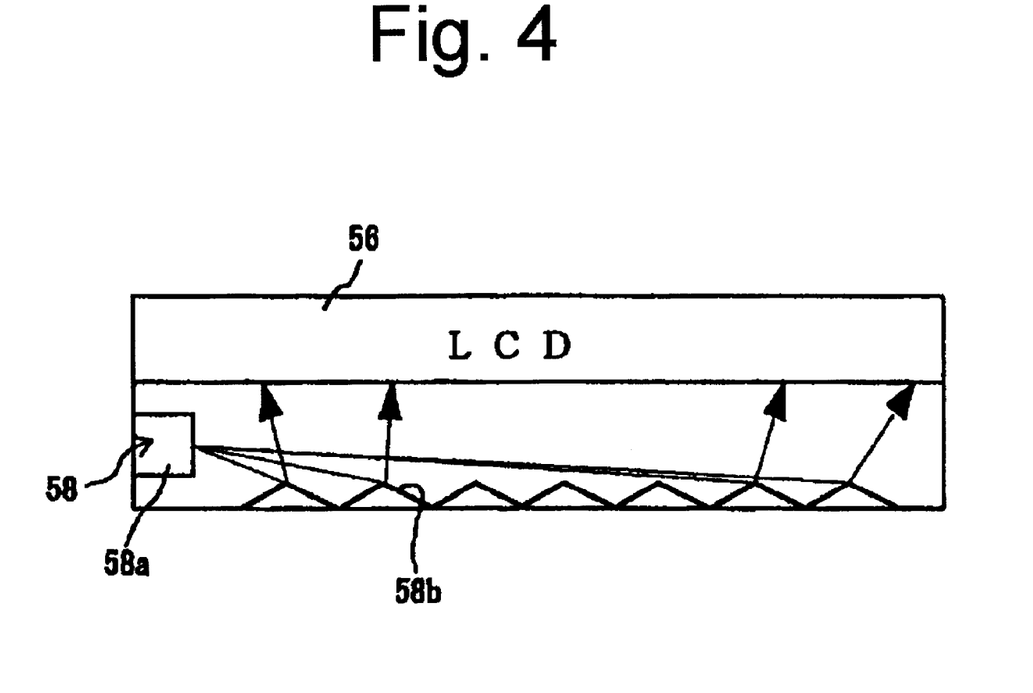
FIG. 4 is an exploded view of the brake force control mechanism.

The brake force control mechanism 15 has a brake-side member 30, a friction engagement unit 31 that creates a friction force in a brake force transmission path between the brake-side member 30 and the hub shell 11, and a friction force adjustment unit 32 for adjusting the friction force created by the friction engagement unit 31. As shown in FIGS. 2–4, the brake side member 30 includes a plurality of splines 30a formed on the left side for engaging a brake drum 81 of a roller brake 80; a flange 40 rotatably mounted inside left hub shell 16, and a tubular part 41 that extends axially inwardly from the inner peripheral surface of the flange 40. The inner peripheral surface of flange 40 forms the first cup 21 of first bearing 13. The tubular part 41 has a female threaded portion 41a (FIG. 3) formed on the inner peripheral surface thereof, a caulking portion 41b comprising a knurled inner peripheral surface formed at the axially outer end, and a plurality of (e.g., three) equally spaced axially extending engagement grooves 41c formed around the outer peripheral surface thereof.

The friction engagement unit 31 is disposed around the tubular part 41 of the brake-side member 30. The friction engagement unit 31 includes a plurality of (e.g., three) first friction discs 45 and a plurality of (e.g., three) second friction discs 46, wherein the plurality of first friction discs 45 are interleaved with the plurality of second friction discs 46. Each first friction disc 45 has protrusions 45a that are formed at three equally spaced locations on the inner peripheral surface thereof for nonrotatably engaging the engaging grooves 41c formed on the outer peripheral surface of the tubular part 41. Each second friction disc 46 has a plurality of splines 46a formed on the outer peripheral surface thereof for nonrotatably engaging the plurality of splines 16a of the left hub shell 16. In addition, patterned indented surfaces 46b, which provide a larger diameter to the second friction discs 46 than the inner diameter of the opening of the left hub shell 16, are formed on the outer peripheral surfaces of the plurality of splines 46a in two of the three second friction discs 46. Consequently, these two second friction discs 46 are press-fit into the inside of the left hub shell 16, thus providing a firm coupling between the brake-side member 30 and the left hub sell 16. As a result, the brake-side member 30, which also forms the first cup 21 of the bearing 13, does not rattle, and the bearing 13 reliably supports the hub shell 11.

The friction force adjustment unit 32 has a spring washer 50 and an adjustment member 51. The adjustment member 51 is a collared cylindrical member comprising a cylindrical part 51a and a flange 51b that is integrally formed with the cylindrical part 51a. The cylindrical part 51a has a male threaded portion 51c and a rotation engagement portion 51d disposed on its inner peripheral surface. The male threaded portion 51c engages the female threaded portion 41a of the tubular part 41. The rotation engagement portion 51d has a hexagonal cross-section so that a tool such as an Allen key may rotate the adjustment member 51. Rotation of adjustment member 51 relative to the brake-side member 30 causes the flange 51b to increase or decrease the friction force created between the friction discs 45 and 46 through spring washer 50 to set the maximum braking allowed force for the roller brake 80, thereby controlling the braking force of the roller brake 80.

To assemble the front hub 1, the friction discs 45 and 46 of the brake force control mechanism 15 are first alternately mounted to the brake-side member 30. After mounting the spring washer 50, the adjustment member 51 is screwed into the tubular part 41 to create a desired amount of friction force between friction discs 45 and 46, and the brake force control mechanism 15 is installed into the hub shell 11. Then, the friction force of the brake force control mechanism 15 is rechecked. If the friction force reading has changed from the desired value, an Allen key may be placed in the rotation engagement portion 51d to rotate the adjustment member 51 while the brake-side member 30 is held stationary, thus adjusting the friction force created between the friction discs 45 and 46. It is also acceptable if the brake-side member 30 is turned after a jig is placed in the rotation engagement portion 51d and the adjustment member is locked in place. After the desired friction force is obtained, the diameter of the rotation engagement portion 51d may be enlarged radially outwardly toward the caulking portion 41b for caulking purposes. This reduces the chance that the set friction force of the brake force control mechanism 15 will change while it is housed in the hub shell 11. Installing the hub shaft 10 and bearings 13 and 14 completes the assembly of the front hub 1.

Because the maximum braking force allowed by the brake force control mechanism 15 can be adjusted with the brake force control mechanism 15 housed in the hub shell 11 in this embodiment, even if the maximum allowed braking force changes due to deformation of the second friction discs 46 of the brake force control mechanism 15 when they are pressed into the hub shell 11 (or from some other reason), the original maximum allowed braking force can be restored very easily without removing the brake force control mechanism 15 from the hub shell 11.

While the above is a description of various embodiments of inventive features, further modifications may be employed without departing from the spirit and scope of the present invention. For example, in the described embodiment the maximum allowed braking force of the brake force control mechanism 15 was adjusted by placing an Allen key in the rotation engagement portion 51d formed in the inner peripheral surface of the adjustment member 51, but any construction may be used for adjusting the maximum allowed braking force.

Figure 5:
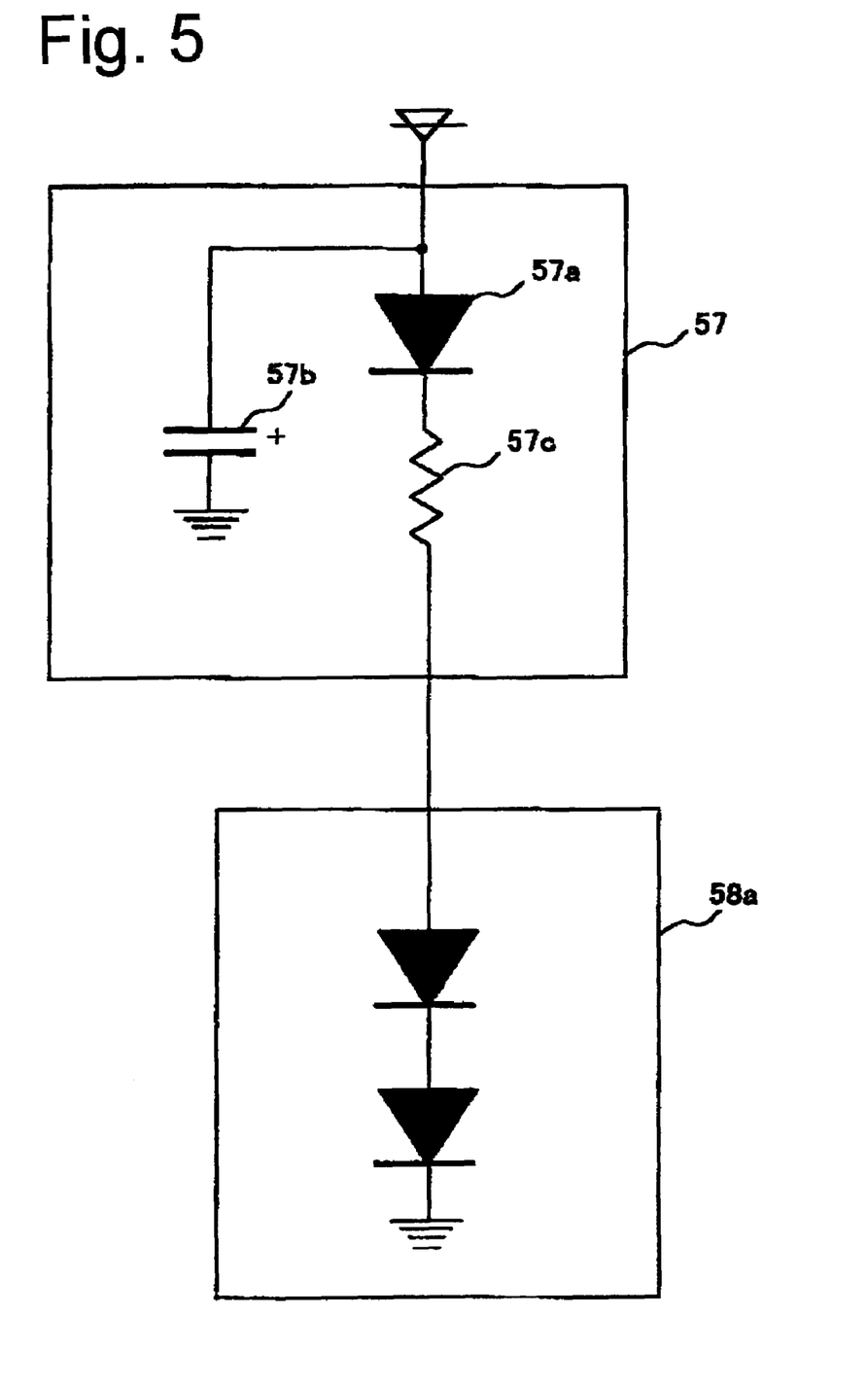
FIG. 5 is a partial cross-sectional view of a wheel hub that includes another embodiment of a brake force control mechanism.

FIG. 5 is a partial cross-sectional view of a front hub 108 that includes another embodiment of a brake force control mechanism. In this embodiment, the maximum allowed braking force can be adjusted from outside the hub shell 111. While the construction of the friction engagement unit 131 is the same as that described in connection with the previous embodiment, the constructions of the brake-side member 130 and the friction force adjustment unit 132 are different from those in the previous embodiment. Therefore, members having the same construction as those described in connection with the previous embodiment will not be explained again.

In this embodiment, the brake-side member 130 has a male threaded portion 141a on the outer peripheral surface of the tubular part 141. A nut member 151 of the friction force adjustment unit 132 screws onto this male threaded portion 141a. An engagement portion 151a comprising a plurality of splines, for example, is formed on the outer peripheral surface of the nut member 151. It is also acceptable if the engagement portion 151a comprises radial concavities instead of splines.

An engagement hole 116b is formed in the left hub shell 116. A rod-shaped lock member 148 may be placed in the engagement hole 116b so that the tip of the lock member 148 may be engaged in the engagement portion 151a of the nut member 151. In this state, the nut member 151 is rotatably locked relative to the hub shell 111, and the brake-side member 130 then may be rotated relative to the nut member 151, thereby adjusting the friction force of the friction engagement unit 131. After adjustment of the friction force, the engagement hole 116b may be closed with a detachable or non-detachable cover member. As a result, any grease injected inside does not easily leak out, and entry of foreign matter can be prevented.

In this embodiment, an anti-rotation member 149 (e.g., a locknut) is placed between the nut member 151 and the spring washer 150. The anti-rotation member 149 and the nut member 151 have opposing anti-slip surfaces 149a and 151b, respectively, each comprising a knurled surface. As a result, the nut member 151 can be reliably prevented from rotating after adjustment.

The described embodiments involved a front hub, but a brake force control mechanism may be applied to a rear hub that includes an internal gear hub. Only a brake force control mechanism was mounted in the front hub in the described embodiments, but a generator mechanism also may be included therein.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle hub comprising:
   a bicycle wheel hub shaft having first and second portions located axially inwardly from corresponding first and second end tips of the hub shaft and dimensioned to fit within corresponding first and second wheel hub shaft openings in a bicycle frame;
   a hub shell rotatably supported relative to the bicycle wheel hub shaft; and
   a brake force control mechanism housed by the hub shell, wherein the brake force control mechanism is adapted to receive a braking force from a braking device, wherein the brake force control mechanism includes a brake force adjusting mechanism with an outside accessible portion that can be accessed for adjustment while the brake force control mechanism is housed within the hub shell, and wherein the brake force adjusting mechanism sets a maximum braking force communicated from the braking device to the hub shell.

2. The hub according to claim 1 wherein the brake force adjusting mechanism is structured to be accessed from an axial direction.

3. The hub according to claim 1 wherein the brake force adjusting mechanism is structured to be accessed from a radial direction.

4. The hub according to claim 1 wherein the brake force control mechanism comprises:
   a brake side member structured to engage the braking device; and
   a friction engagement unit that creates a friction force in a brake force transmission path between the brake side member and the hub shell.

5. The hub according to claim 4 wherein the brake force control mechanism further comprises a friction force adjusting unit that allows the friction force to be adjusted while the brake control mechanism is housed within the hub shell.

6. A bicycle hub comprising:
   a hub shaft structured to be rotatably mounted to a bicycle frame;
   a hub shell rotatably supported relative to the hub shaft;
   a brake force control mechanism housed by the hub shell, wherein the brake force control mechanism includes a brake force adjusting mechanism that can be accessed for adjustment while the brake force control mechanism is housed within the hub shell;
   wherein the brake force control mechanism comprises:
      a brake side member structured to engage a braking device;
      a friction engagement unit that creates a friction force in a brake force transmission path between the brake side member and the hub shell; and
      a friction force adjusting unit that allows the friction force to be adjusted while the brake control mechanism is housed within the hub shell;
   wherein the friction engagement unit comprises:
      a plurality of first friction members nonrotatably coupled relative to the brake side member; and
      a plurality of second friction members nonrotatably coupled relative to the hub shell;
      wherein the plurality of first friction members are interleaved with the plurality of second friction members.

7. The hub according to claim 6 wherein the friction force adjusting unit comprises an adjusting member that presses the plurality of first friction members and the plurality of second friction members towards each other.

8. The hub according to claim 7 wherein the brake side member comprises:
   a flange; and
   a tubular part extending axially from the flange;
   wherein the plurality of first friction members are nonrotatably supported by the tubular part.

9. The hub according to claim 8 wherein the adjusting member is coupled to the tubular part so that the plurality of first friction members and the plurality of second friction members are sandwiched between the adjusting member and the flange.

10. The hub according to claim 9 wherein the adjusting member is screwed to the tubular part.

11. The hub according to claim 10 wherein the friction force adjusting unit further comprises a spring member disposed between the adjusting member and the flange.

12. The hub according to claim 10 wherein the adjusting member has a male threaded portion that engages a female threaded portion of the tubular part.

13. The hub according to claim 12 wherein the flange includes an inner peripheral bearing surface.

14. The hub according to claim 10 wherein the adjusting member has a tubular portion.

15. The hub according to claim 14 wherein the adjusting member includes a tool engagement portion formed on an inner peripheral surface.

16. The hub according to claim 15 wherein the adjusting member includes a collar so that the plurality of first friction members and the plurality of second friction members are sandwiched between the collar and the flange.

17. The hub according to claim 10 wherein the tubular portion of the adjusting member has a male threaded portion that engages a female threaded portion of the tubular part of the brake side member.

18. The hub according to claim 17 wherein the tubular portion of the adjusting member includes a caulking portion that extends further radially outwardly than the female threaded portion of the tubular part of the brake side member.

19. The hub according to claim 14 wherein the adjusting member includes a tool engagement portion formed on an outer peripheral surface, and wherein the hub shell includes a through-hole for accessing the tool engagement portion.

20. The hub according to claim 19 wherein the tubular portion of the adjusting member has a female threaded portion that engages a male threaded portion of the tubular part of the brake side member.

21. The hub according to claim 1 wherein the outside accessible portion rotates around the hub shaft.

22. The hub according to claim 1 wherein the outside accessible portion has a though hole through which the hub shaft passes.

23. The hub according to claim 1 wherein the adjusting mechanism and the brake force control mechanism are located on a same side of the hub shell.

24. The hub according to claim 1 wherein the brake force adjusting mechanism has a recessed tool receiving opening.

25. The hub according to claim 1 wherein the brake force adjusting mechanism has a member that increases braking force by moving axially outwardly.

26. The hub according to claim 1 wherein the braking force is applied to an inner peripheral surface of the hub shell.

* * * * *

UNITED STATES PATENT AND TRADEMARK OFFICE
CERTIFICATE OF CORRECTION

PATENT NO.    : 7,032,719 B2
DATED         : April 25, 2006
INVENTOR(S)   : Takachi It is certified that error appears in the above-identified patent and that said Letters Patent is hereby corrected as shown below:

The title page, showing an illustrative figure, should be deleted and substitute the attached title page.

Delete drawing sheets 1-5 and substitute the drawing sheets consisting of FIGS 1-5 as shown on the attached pages.

Signed and Sealed this

Sixth Day of June, 2006

JON W. DUDAS
*Director of the United States Patent and Trademark Office*

(12) United States Patent  (10) Patent No.: US 7,032,719 B2
Takachi  (45) Date of Patent: Apr. 25, 2006

(54) BICYCLE HUB WITH AN OUTSIDE-ACCESSIBLE BRAKE FORCE ADJUSTING MECHANISM (75) Inventor: Takeshi Takachi, Kawachinagano (JP)

(73) Assignee: Shimano, Inc., Sakai (JP)

(*) Notice: Subject to any disclaimer, the term of this patent is extended or adjusted under 35 U.S.C. 154(b) by 0 days.

(21) Appl. No.: 10/604,814

(22) Filed: Aug. 19, 2003

(65) Prior Publication Data

US 2004/0104082 A1 Jun. 3, 2004

(30) Foreign Application Priority Data

Aug. 22, 2002 (JP) .............................. 2002-241795

(51) Int. Cl.
B62L 5/00 (2006.01)
B60T 1/06 (2006.01)
(52) U.S. Cl. ........................................ 188/26; 188/17
(58) Field of Classification Search ............ 188/17, 188/24.11, 26; 301/110.5, 105.1
See application file for complete search history.

(56) References Cited

U.S. PATENT DOCUMENTS

| 3,799,472 | A | * | 3/1974 | Svensson | 242/270 |
| 4,109,762 | A | * | 8/1978 | Wood | 188/26 |
| 5,456,336 | A | * | 10/1995 | Bopp | 188/17 |
| 5,570,760 | A | * | 11/1996 | Lai | 188/26 |
| 6,559,564 | B1 | * | 5/2003 | Itou | 310/67 A |
| 2003/0057032 | A1 | * | 3/2003 | Liu | 188/24.11 |

FOREIGN PATENT DOCUMENTS

EP 688 713 A2 12/1995
EP 1122094 A2 * 8/2001

OTHER PUBLICATIONS

Patent Abstracts of Japan, vol. 018, No. 605 (M-1706), published Nov. 17, 1994; for JP 06-227472 A (Nakano), published Aug. 16, 1994.

* cited by examiner

Primary Examiner—Thomas Williams
(74) Attorney, Agent, or Firm—James A. Deland (57) ABSTRACT A bicycle hub comprises a hub shaft structured to be rotatably mounted to a bicycle frame, a hub shell rotatably supported relative to the hub shaft, and a brake force control mechanism housed by the hub shell. The brake force control mechanism includes a brake force adjusting mechanism that can be accessed for adjustment while the brake force control mechanism is housed within the hub shell.

26 Claims, 5 Drawing Sheets